J. F. MacINDOE.
GREASE CUP.
APPLICATION FILED SEPT. 22, 1919.
1,353,171.
Patented Sept. 21, 1920.
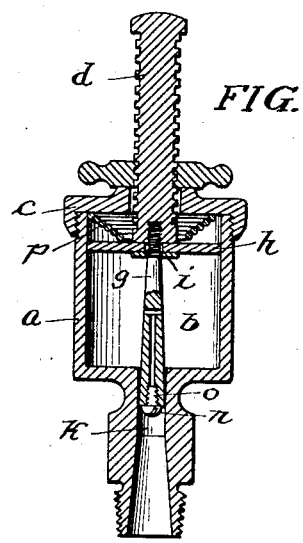
FIG. 1.
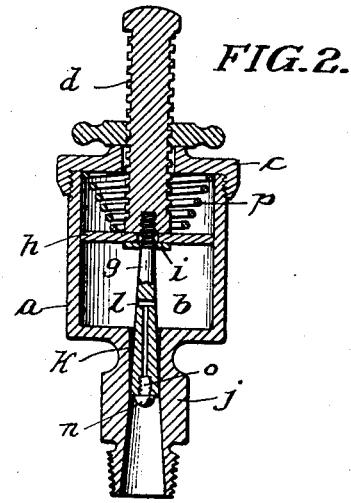
FIG. 2.
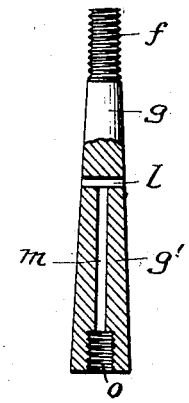
FIG. 4.
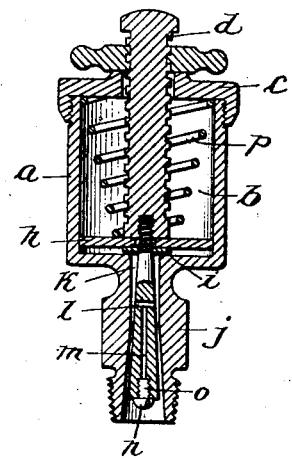
FIG. 3.
FIG. 5.
WITNESSES:
W. Leigh Durham
INVENTOR
JOHN F. MAC INDOE
BY
ATTORNEY.

UNITED STATES PATENT OFFICE.

JOHN FRANKLIN MacINDOE, OF SCHUYLKILL FALLS, PENNSYLVANIA.

GREASE-CUP.

1,353,171.  Specification of Letters Patent.  Patented Sept. 21, 1920.

Application filed September 22, 1919. Serial No. 325,352.

*To all whom it may concern:*

Be it known that I, JOHN FRANKLIN MAC-INDOE, a citizen of the United States, residing at Schuylkill Falls, in the county of Philadelphia and State of Pennsylvania, have invented certain new and useful Improvements in Grease-Cups, of which the following is a specification.

This invention relates to grease cups or lubricators of the type from which the lubricant is automatically ejected by means of pressure applied thereto, and is a modification of the device shown in Letters Patent No. 1,283,841 under date of November 5th, 1918.

In the application above referred to an object was to provide a device that would deliver a constant and uniform flow or movement of the lubricant to the bearing and as well the prevention of the flooding of the cup at the beginning of the stroke of the plunger.

These objects were attained by means of a straight control valve stem, terminating in a cylindrical plug member operable in a shank having a continuously tapering outlet, the taper extending throughout the entire length of said shank and gradually increasing in diameter from the upper to the lower extremity thereof, providing a gradually increasing area for the flow of the lubricant after the plug member had descended substantially its own length within the shank, in proportion to the pressure means.

Similar functions are objects of the present device, the control valve stem, terminating in a tapering valve member, however, in this instance, descending from its point of connection with the plunger in a tapering manner into a straight part of the shank outlet, thereby preventing the flooding of the said outlet at the initial stroke of the plunger. The said oulet then tapering from such point to its terminus, providing a gradually increasing area for the flow of the lubricant, in proportion to the weakening of the pressure means.

In the further disclosure of the invention reference is to be had to the accompanying drawings, constituting a part of this specification, in which similar characters of reference denote corresponding parts, in all views, and in which;

Figure 1 is a vertical sectional view of the usual type of grease cup, before compressing, with my spring actuated plunger or piston in position;

Fig. 2 is a similar view to Fig. 1, the spring being, however, but partially compressed and showing the control valve in the straight part of the shank outlet;

Fig. 3 is likewise a vertical sectional view of the usual type of grease cup, after compression;

Fig. 4 is a vertical sectional view of the control valve stem and valve member, and Fig. 5 is a detail view of the flat sided screw used to increase the flow of the lubricant.

Referring in detail to said views the character $a$ designates the body or barrel of a grease cup, the interior portion $b$ thereof comprising a receptacle for the lubricant.

A cap or cover $c$ is provided to fit slidingly over the barrel $a$ and has a suitable opening to permit of the stem $d$ passing therethrough. Said stem $d$ is drilled and threaded centrally at its base to receive the threaded end $f$ of the control valve stem $g$.

A plunger $h$ is held in position by the engagement of the control valve stem $g$ with the stem $d$. As the stem $g$ is screwed into the threaded portion of the stem $d$ it holds the plunger $h$ securely, making the three parts one operative unit. Said plunger $h$ is provided with a suitable opening for the passage of the threaded end of the stem $g$. A washer $i$ is provided, as shown, to firmly hold the parts in alinement.

The shank $j$ is formed, as illustrated, having a straight bore $k$ for a portion of its depth and then tapering to its terminus.

The control valve stem $g$ terminating in the control valve member $g'$ descends in a tapering manner from its point of connection with the plunger $h$ loosely into the straight part or bore $k$ of the shank. This straight portion of the bore or outlet $k$ should extend to such a depth that at the initial stroke of the plunger $h$, the control valve member $g'$ will enter same the entire depth of said straight bore, limiting the area of the flow of lubricant at the initial stroke of the plunger $h$. As before said from this point downwardly the said bore or shank outlet $k$ tapers to its terminus, providing a gradually increasing area for the flow of the lubricant as the control valve descends and the pressure means weaken.

The function of the control valve is as follows:

When the plunger of a spring actuated piston begins its downward stroke the strongest point of expansion is during the first quarter of the stroke and unless the outlet is throttled the result will be an excess delivery of the lubricant during the first part of the stroke. As the plunger descends the spring weakens and the flow of lubricant diminishes proportionately.

Said shank $j$ is exteriorly threaded at its lower extremity.

The control valve member $g'$ is provided in its lower portion with the vertical port $m$ communicating with the horizontal port $l$. The vertical port $m$ is interiorly threaded at its base to engage the exteriorly threaded portion $o$ of the flat sided screw $n$.

In operation the barrel $a$ is filled with lubricant, the cap or cover $c$, containing the plunger, which at this time is at its extreme down stroke or on a level with the outlet or lower part of cover $c$ and the spring $p$ is expanded to full stroke length, is slid over the upper or open end of the barrel $a$, which causes the said plunger $h$ to enter the interior of the barrel $a$ and in contact with the lubricant. As the cover is forced downwardly, the plunger $h$ is forced upwardly, compressing the spring $p$. The cover is then locked. The control valve is in position and the cup is ready to deliver the lubricant. The expansion of the spring $p$ gradually displaces the lubricant in such amount as is regulated by the operation of the control valve within the shank. During the initial stroke of the plunger the control valve, which is tapered, descends into the straight bore or outlet of the shank, limiting the area for the flow of the lubricant at this point, after which the tapered control valve descends into the tapered part of the shank outlet providing a gradually increasing area for the flow of the lubricant until the stroke of the plunger $h$ has been completed and the cup emptied.

To increase the flow of the lubricant, if desired, the flat sided screw $n$ is loosened which permits the lubricant to flow past the flat side thereof and out between the head of the screw and the bottom of the control valve member $g'$.

I claim:

1. The combination of a lubricating cup having a spring actuated plunger, a tapering valve stem terminating in a tapering valve member, operatively secured thereto, adapted to fit loosely within the opening of the shank, a shank having a straight outlet for a portion of its depth to limit the area of the flow of the lubricant during the initial stroke of the plunger and after the control valve member has descended therein, and then tapering to its terminus thereby providing a gradually increasing area for the flow of the lubricant in proportion to the weakening of the pressure means.

2. The combination of a lubricating cup having a spring actuated plunger, a tapering valve stem terminating in a tapering valve member, operatively secured thereto, adapted to fit loosely within the opening of the shank, said valve being provided with a horizontal port and a vertical port communicating therewith, a shank having a straight outlet for a portion of its depth to limit the area of the flow of the lubricant during the initial stroke of the plunger and after the control valve member has descended therein, and then tapering to its terminus thereby providing a gradually increasing area for the flow of the lubricant in proportion to the weakening of the pressure means and means to increase the flow of the lubricant.

In testimony whereof I affix my signature.

JOHN FRANKLIN MacINDOE.

Witness:
M. VAN BOOSKIRK.